United States Patent
Hellman

(10) Patent No.: US 10,200,706 B2
(45) Date of Patent: Feb. 5, 2019

(54) PIPELINED VIDEO DECODER SYSTEM

(71) Applicant: AVAGO TECHNOLOGIES GENERAL IP (SINGAPORE) PTE. LTD., Singapore (SG)

(72) Inventor: Timothy Moore Hellman, Concord, MA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/876,015

(22) Filed: Jan. 19, 2018

(65) Prior Publication Data

US 2018/0146205 A1 May 24, 2018

Related U.S. Application Data

(63) Continuation of application No. 14/335,715, filed on Jul. 18, 2014, now Pat. No. 9,877,034.

(60) Provisional application No. 61/979,255, filed on Apr. 14, 2014.

(51) Int. Cl.
*H04N 19/44* (2014.01)
*H04N 19/51* (2014.01)
*H04N 19/433* (2014.01)
*H04N 19/597* (2014.01)

(52) U.S. Cl.
CPC ........... *H04N 19/433* (2014.11); *H04N 19/44* (2014.11); *H04N 19/51* (2014.11); *H04N 19/597* (2014.11)

(58) Field of Classification Search
CPC ...... H04N 19/44; H04N 19/51; H04N 19/597; H04N 19/433
See application file for complete search history.

(56) References Cited

U.S. PATENT DOCUMENTS

| | | | |
|---|---|---|---|
| 6,081,296 A | 6/2000 | Fukunaga et al. | |
| 9,877,034 B2* | 1/2018 | Hellman | H04N 19/433 |
| 2002/0087685 A1 | 7/2002 | Lassen et al. | |
| 2013/0114690 A1 | 5/2013 | Chono et al. | |

OTHER PUBLICATIONS

Series H: Audiovisual and Multimedia Systems Infrastructure of audiovisual services—Coding of moving video—High efficiency video recording, dated Apr. 2013, pp. 1-317, ITU-T Telecommuncation Standardization Sector of International Telecommunication Union, www.ituint/ITU-T/ipr Geneva, Switzerland ITU copyright 2013.

* cited by examiner

*Primary Examiner* — Huy T Nguyen
(74) *Attorney, Agent, or Firm* — Morgan, Lewis & Bockius LLP

(57) ABSTRACT

Efficient decoding of video content that may involve intra block copy operations, such as copying pixel data from one region of a frame to another region of the same frame is described. For example, a method to decode the video content may involve identifying the video frame in which intra block copy operation is to be performed, prior to the intra block copy operation being initiated. A video decoder may prefetch the pixel data from the source region to a local buffer with low memory latency such that the source pixel data to be copied into the destination blocks in the video frame is readily available. Thus, costly, and time consuming memory access may be avoided, and in turn a video decoding pipeline may operate smoothly without any stalling.

20 Claims, 8 Drawing Sheets

- 1: Local Buffer
  - IBC copy falls in localbuffer, no need to schedule memory fetch
- 2: Memory
  - IBC copy falls outside of local buffer, request memory fetch
- 3: Mixed
  - IBC copy falls partially outside local buffer, request external portions

PIPELINED VIDEO DECODER SYSTEM

PRIORITY CLAIM

This application claims priority to U.S. patent application Ser. No. 14/335,715, filed Jul. 18, 2014, entitled "PIPELINED VIDEO DECODER SYSTEM," now U.S. Pat. No. 9,877,034, which claims priority to U.S. Provisional Patent Application No. 61/979,255 filed Apr. 14, 2014, both of which are entirely incorporated by reference herein.

TECHNICAL FIELD

This disclosure relates to video decoding and particularly to pipelined video decoding techniques.

BACKGROUND

Rapid advances in electronics and communication technologies, driven by immense customer demand, have resulted in the worldwide adoption of devices that display a wide variety of video content. Examples of such devices include smartphones, flat screen televisions, and tablet computers. Improvements in video processing techniques will continue to enhance the capabilities of these devices. Accordingly, coding of screen content video is becoming important because of applications such as wireless displays, remote desktop, remote gaming, automotive infotainment, cloud computing, distance education and many others.

DETAILED DESCRIPTION

Video content is encoded using various encoding techniques and standards such as MPEG-1, MPEG-2, H.264, H.265, and many others. The H.265 standard is also referred to as High Efficiency Video Coding (HEVC). The encoding techniques may be used to compress video content for efficient transmission over wired or wireless networks. The compression may involve predicting pixel values based on video content that may be used as reference video content. For example, spatial prediction may be performed to predict pixel values based on immediate neighboring pixels in a video frame. In addition, or alternatively, temporal prediction may be performed in which pixel values are predicted based on corresponding pixel values in previous or subsequent frames.

Additional operations may be performed when the video content being transmitted is screen content. Screen content sharing may involve sharing, or transmitting content being displayed on one display device, or screen, to another display device or screen. Alternatively, content may be transmitted from a source device without display capability to a display device. For example, wireless screen sharing from mobile devices to large screens may enable displaying video content being displayed on a mobile device, such as a phone, tablet, or a computer to a large screen, such as a television (TV) or projector. For example, technologies such as Miracast, Apple AirPlay, or Chromecast may be used. Additionally, or alternatively video content may be shared between a set-top box and a TV. Further yet, the content may be communicated and shared via a wired transmission.

The video content being shared may have mixed content consisting of video, text and graphics in the same picture. Further, the shared video content may include camera captured content and computer generated content such as text and graphics. For example, during a video conference, camera captured content, such as an image of a presenter may be shared along with contents being displayed on a device being used by the presenter, such as a computer with a presentation slides or other such content.

In one exemplary scenario the source device may decode the content before transmitting to the display device. Alternatively, the shared video content may be decoded at a receiver to display the contents. The video content may be decoded on a macroblock-by-macroblock basis.

Figure 1:
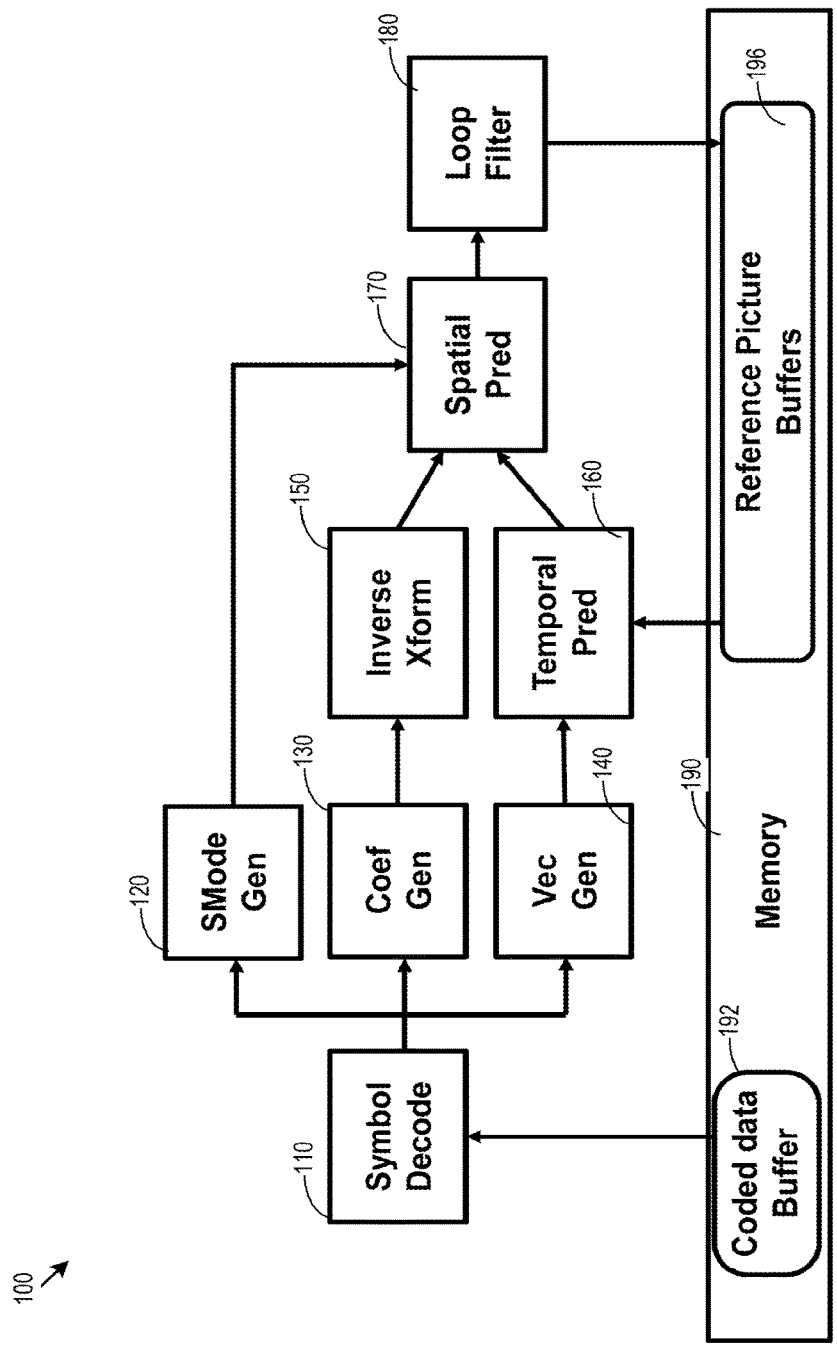
FIG. 1 illustrates a block diagram of an example video decoder.

FIG. 1 illustrates a block diagram of an example video decoder 100. A video decoder may also be referred to as a stream parser, or simply a decoder. The video decoder 100 may include circuitry to perform various functions. For example, the video decoder 100 may include circuitry for a symbol decoder 110, a spatial mode generator 120, coefficient generator 130, vector generator 140, inverse transformer 150, temporal predictor 160, spatial predictor 170, loop filter 180, and a memory storage unit 190. Other examples of video decoders may include circuitry that performs operations of a combination of more than one of the above listed components of video decoder 100. Alternatively, or in addition the components of the video decoder 100 may use additional circuitry, such as one or more processors.

The memory storage unit 190 may be a computer readable storage medium, such as random access storage memory (RAM) for example dynamic random access memory (DRAM). The memory storage unit 190 may contain data that is used by the components of the video decoder 100 to decode video content. The video content to be decoded may be received by the video decoder 100 and may be stored in the memory storage unit 190, for example in the coded data buffer 192. The data stored in the coded data buffer 192 may involve a raw video stream that is generated after completion of steps such as finding start code, byte destuffing, and other preliminary analysis of the received video content. The received video content, which may be received as a video stream, may comprise video data encoded according to one or more of a plurality of encoding standards, such as H.261, H.263, H.263+(Annex J), H.264, VC-1, MPEG-1, MPEG-2, MPEG-4, and/or H.265, for example. The video decoder may be adapted to detect one or more start codes and start code suffixes, to determine the encoding type and generate the raw video content in the video stream.

The memory storage unit 190 may also contain reference data that may be used during the decoding, such as in the reference picture buffers 196. The data in the reference picture buffers may be stored by the components of the video decoder 100, before, after or during the decoding process.

The symbol decoder 110 may also be referred to as a symbol interpreter. The symbol decoder 110 may receive or access the video content stored in the memory storage unit 190. Alternatively, or in addition, the symbol decoder 110 may receive the video content to be decoded via a communication interface, such as a communication port. The symbol decoder 110 may decode/interpret received content, such as, for example, single syntax elements from the video content that were encoded utilizing fixed length coding (FLC), variable length coding (VLC) or Context-Adaptive Binary Arithmetic Coding (CABAC) coding techniques. The video content may be divided into frames with each frame further composed of blocks (macroblocks) of pixels. The spatial mode generator 120 may determine prediction mode to be used by the temporal predictor 160 and/or the spatial predictor 170. The prediction mode, for example, and among other factors may indicate size of the macroblock partition used during prediction by the predictors.

The coefficient generator 130 may generate one or more quantized frequency coefficients from the video content. Quantized frequency coefficients generated by the coefficient generator 130 may be subsequently utilized within the video decoder 100 to generate prediction error information utilized during reconstruction of one or more macroblocks, or blocks of the video content. The generated quantized frequency coefficients may be communicated to the inverse transformer 150 for further processing.

The vector generator 140 may be adapted to generate one or more motion vectors from the video content. The motion vectors generated by the vector generator 140 may be utilized within the video decoder 100 to generate prediction pixels utilized during reconstruction of one or more macroblocks. The generated motion vector information may be communicated to components responsible for other functions, such as motion compensation, for further processing.

The inverse transformer, or inverse quantization transformer (IQT) 150 includes suitable circuitry, logic and/or code to transform quantized frequency coefficients received from the symbol interpreter 110 into one or more prediction errors. The IQT 150 may transform the quantized frequency coefficients back to spatial domain, thus generating prediction error information. The prediction error information generated by the IQT 150 may then be communicated to the other components of the video decoder 100 for further processing during reconstruction of a macroblock.

The temporal predictor 160 may involve suitable circuitry, logic and/or code to generate prediction pixels utilizing motion vector information received from motion vector generator 140. For example, the temporal predictor 160 may generate prediction pixels for temporally predicted macroblocks, which may be associated with pixels in frames/fields neighboring a current frame/field. The temporal predictor 160 may acquire previous and/or subsequent frames/fields from the reference picture buffers 196 and utilize the acquired previous and/or subsequent frames/fields for predicting temporally encoded pixels within a current macroblock. The reference picture buffers 196 may also be referred to as frame buffers. The temporal predictor 160 may be further adapted to interpolate one or more prediction pixels within a current frame utilizing motion vector information, as well as one or more reference frames that are temporally adjacent to the current frame. Further, prediction pixels may be interpolated utilizing only one reference frame or more than one prediction reference frame, during the temporal prediction of a current frame. The temporal predictor 160 may include separate circuitry to handle the bi-directional prediction that may be utilized to generate the prediction pixels from more than one reference frame.

The spatial predictor 170 may involve suitable circuitry, logic and/or code to generate prediction pixels. The prediction pixels may be generated from neighboring pixels in the same frame. The spatial predictor 170 may also contain a reconstruction block (not shown) to add the prediction and the prediction error to generate a decoded macroblock. The spatial predictor 170 acquires macroblock type information, slice type information and/or prediction mode information, for example, from the symbol interpreter 110 and the spatial mode generator 120. The spatial predictor 170 may then utilize the acquired macroblock type information, slice type information and/or prediction mode information to generate prediction pixels for spatially predicted macroblocks.

The loop filter 180 may include suitable circuitry, logic and/or code to further filter a decoded/reconstructed macroblock. Depending on the encoding method of the video content, the loop filter may use a deblocking filter. The deblocking filter may be utilized by the loop filter 180 to reduce edge artifacts and transform blockiness effects along one or more edges of a reconstructed macroblock.

The video decoding performed by the video decoder 100 can thus be performed in a deterministic pipelined structure. The memory fetches performed during the decoding are pre-determined. For example, prior to processing video frame data received by the video decoder 100, components of the video decoder 100 may initiate memory access to retrieve data that may be used for the processing. For example, the vector generator 140, may identify and determine reference blocks to be used for the temporal prediction that needs to be performed for the received video frame. Accordingly, before the temporal predictor 160 begins the actual process of temporal prediction, the temporal predictor 160 may fetch the reference frames to be used for processing the video frame. Further, while the temporal predictor is performing the temporal prediction, the spatial predictor 170 may identify the data that may be used for spatial prediction and overlap a memory access required to retrieve the data with the temporal prediction operation. As such, memory latency may be hidden by overlapping the memory fetch operations with operations of the decoding process.

In addition, or alternatively, video content sharing, such as screen content sharing may use Intra block copy (IBC) when encoding and decoding the shared video content. IBC may involve a block matching technique in which a Coding Unit (CU) may be predicted as a displacement from already reconstructed block of samples from neighboring regions in the same frame, or picture.

Figure 2:
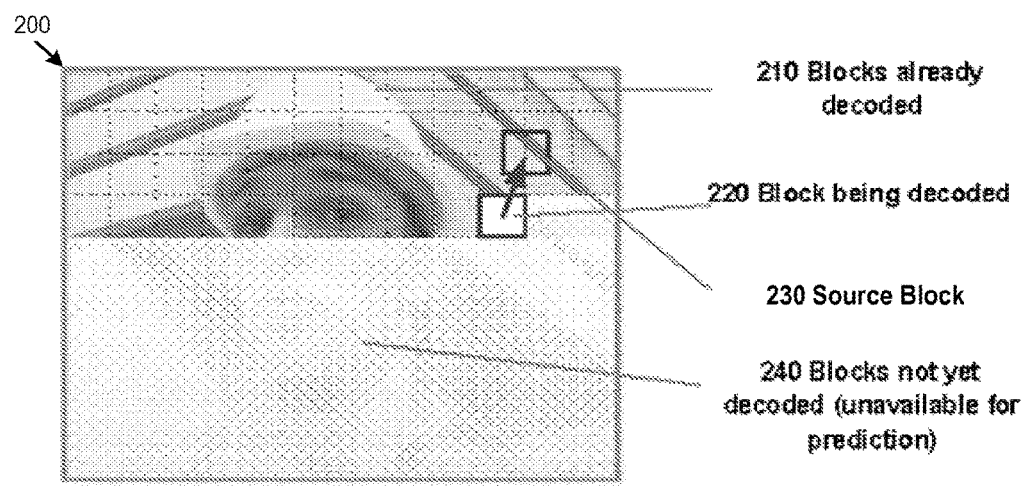
FIG. 2 illustrates an example intra block copy operation.

FIG. 2 illustrates an example intra block copy. The intra block copy is being performed on a frame 200. The frame 200 is an image. The image may be a stand-alone image or a part of a video content stream. The frame 200 may be divided into various blocks, including blocks that are already decoded 210 and blocks that are yet to be decoded 240. Block 220 is currently being decoded. The encoded video content stream indicates that the contents of the block 220 may be copied from content of the blocks that are already decoded 210. FIG. 2 illustrates that block 220 may be decoded, by copying contents of the block 230, that is block 230 is a source block and block 220 is a destination block. It will be understood that various other combinations of source and destination blocks are possible, including source blocks 230 which do not align with blocks already decoded 210; some possible exemplary situations are detailed throughout this disclosure.

Figure 3:
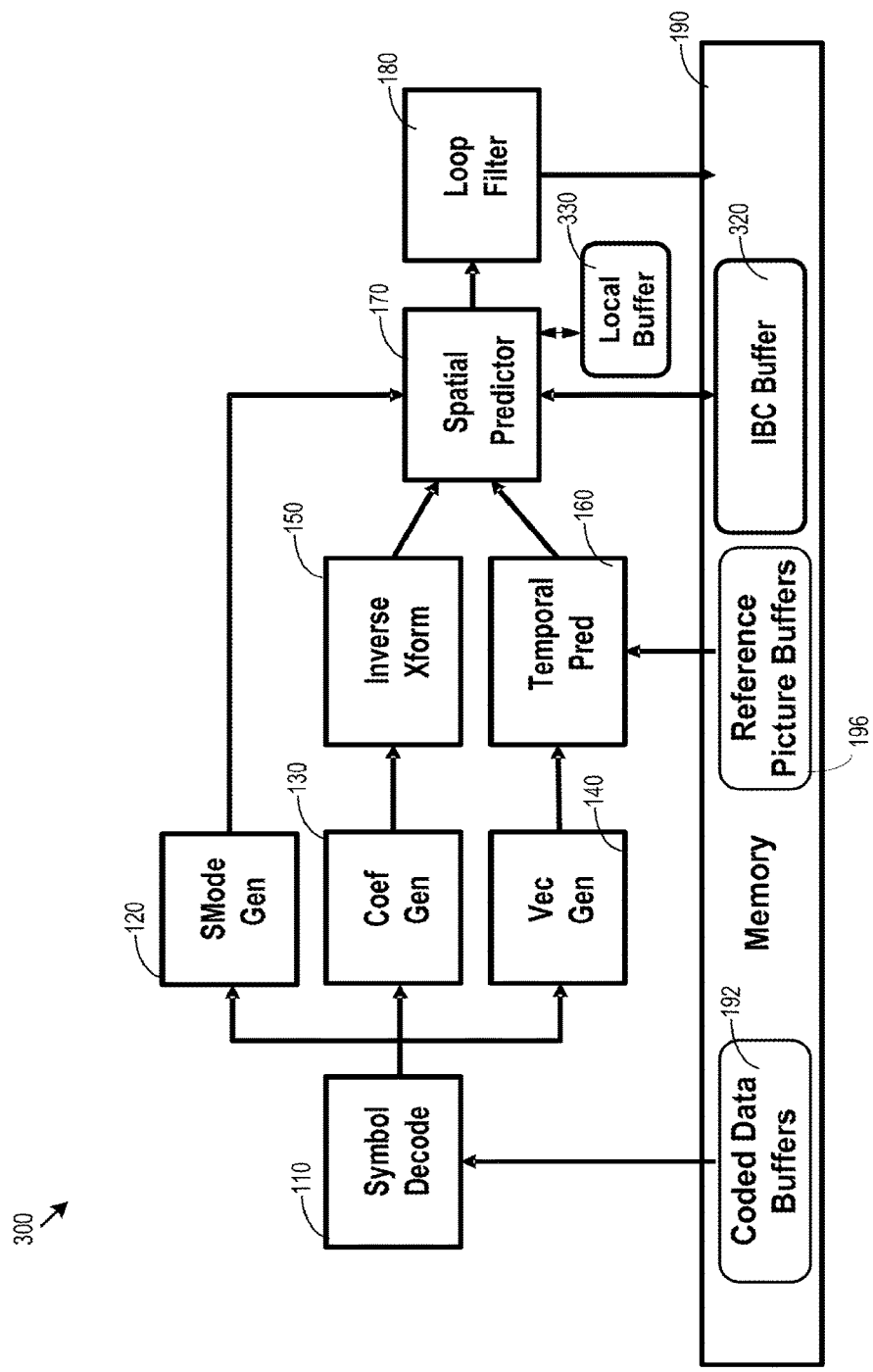
FIG. 3 illustrates an exemplary video decoder.

FIG. 3 illustrates an exemplary video decoder 300 with circuitry capable to perform the intra block copy operation. The video decoder 300 may use the spatial predictor 170 for block copy operations and at least parts of the memory 190, such as IBC buffer 320, for the intra block copy. The IBC buffer 320 may be part of the memory storage unit 190 which may be off-chip, or external to the circuitry. The decoder 300 may further include an internal, or on-chip storage unit represented by a local buffer 330. In other examples, memory storage 190 and local buffer 330 may be on-chip, off-chip and/or some combination of on-chip and off-chip such that the local buffer 330 provides temporary local storage that is accessible more quickly than the relatively long term storage in the memory storage 190. Although, FIG. 3 does not illustrate a spatial predictor block 170, other example video decoders may include the spatial predictor block 170.

The spatial predictor 170 may include suitable circuitry, which may be operable with logic and/or code, to perform the intra block copy. The blocks 210 of the frame that have been already decoded and filtered may be written into the memory storage unit 190. In addition, a copy of the blocks 210, prior to the operations by the loop filter 180, may be stored in the IBC buffer 320. Thus, two copies of the blocks 210 may exist—one pre-filtered stored the IBC buffer 320 and one post-filtered, stored in the reference picture frames 196. The pre-filtered content in the IBC buffer 320 may be used as data source for the intra block copy. Alternatively, or in addition, at least a part of the pre-filtered decoded blocks 210 may be stored in a faster storage location, such as a local storage location, which may be an internal or on-chip storage, such as a local buffer 330. In another exemplary scenario, the local storage location may be used to store part of the post-filtered decoded blocks 210. The local storage unit 330 may have lower memory latency than the memory storage unit 190. The local buffer 330 may have lesser capacity than the memory storage unit 190 and therefore, all of the pre-filtered decoded blocks 210 may not be stored in the local buffer 330.

Figure 4:
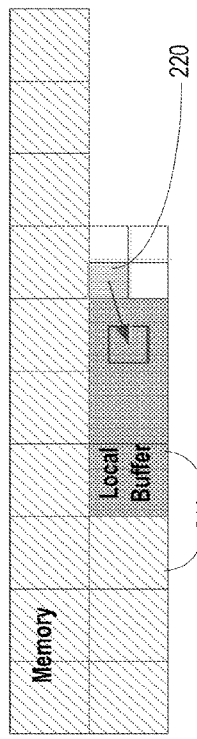
FIG. 4 illustrates example memory access cases during video decoding.
Figure 4:
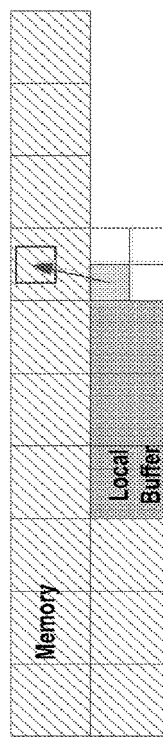
Figure 4:
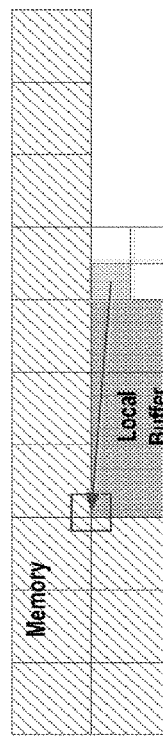

FIG. 4 illustrates three example memory access cases. There may be other memory access scenarios possible, and these are just example cases for purpose of explanation. The decoded blocks 210 may be distributed across the slower and faster memory locations, such as the local buffer 330 and the IBC buffer 320 in the memory 190. The local buffer 330 may be on-chip storage and the IBC buffer 320 may be off-chip storage. Thus, the spatial predictor 170 may access the decoded blocks 210 from the memory storage unit 190 and/or the local buffer 330 to copy contents of the decoded blocks 210 to the block 220 that is currently being decoded. In case 1 shown in FIG. 4, the source data to be copied into block 220 is part of decoded blocks 210 that are all stored in the local buffer 330. In case 2, the source data blocks 210 are all stored in the IBC buffer 320. Case 3 illustrates an example where part of the source data blocks 210 to be copied into block 220 are stored in the faster, local buffer 330 and the rest of the data blocks are in the relatively slower memory 190, particularly in the IBC buffer 320. In all cases, the intra block copy operation may be performed in response to the video content stream including an indicator to perform the intra block copy operation.

The intra block copy performed may have to access slower memory, such as the memory storage unit 190, which may slow down the video decoding process, for example due to the memory latency. The memory access fetching time may stall the pipeline. Further yet, since the intra block copy operates on blocks of the same frame data, the data that is to be copied into block 220 may have been decoded recently, and may not have yet been written into the IBC buffer 320. Thus, the decoder pipeline may have to first wait for the write operation for the decoded blocks 210 to complete and then incur the memory latency to read the written decoded blocks 210. Although a cache may be partial solution, cache misses may still lead to memory latency, which in a real time operation such as video decoding are not affordable.

Figure 5:
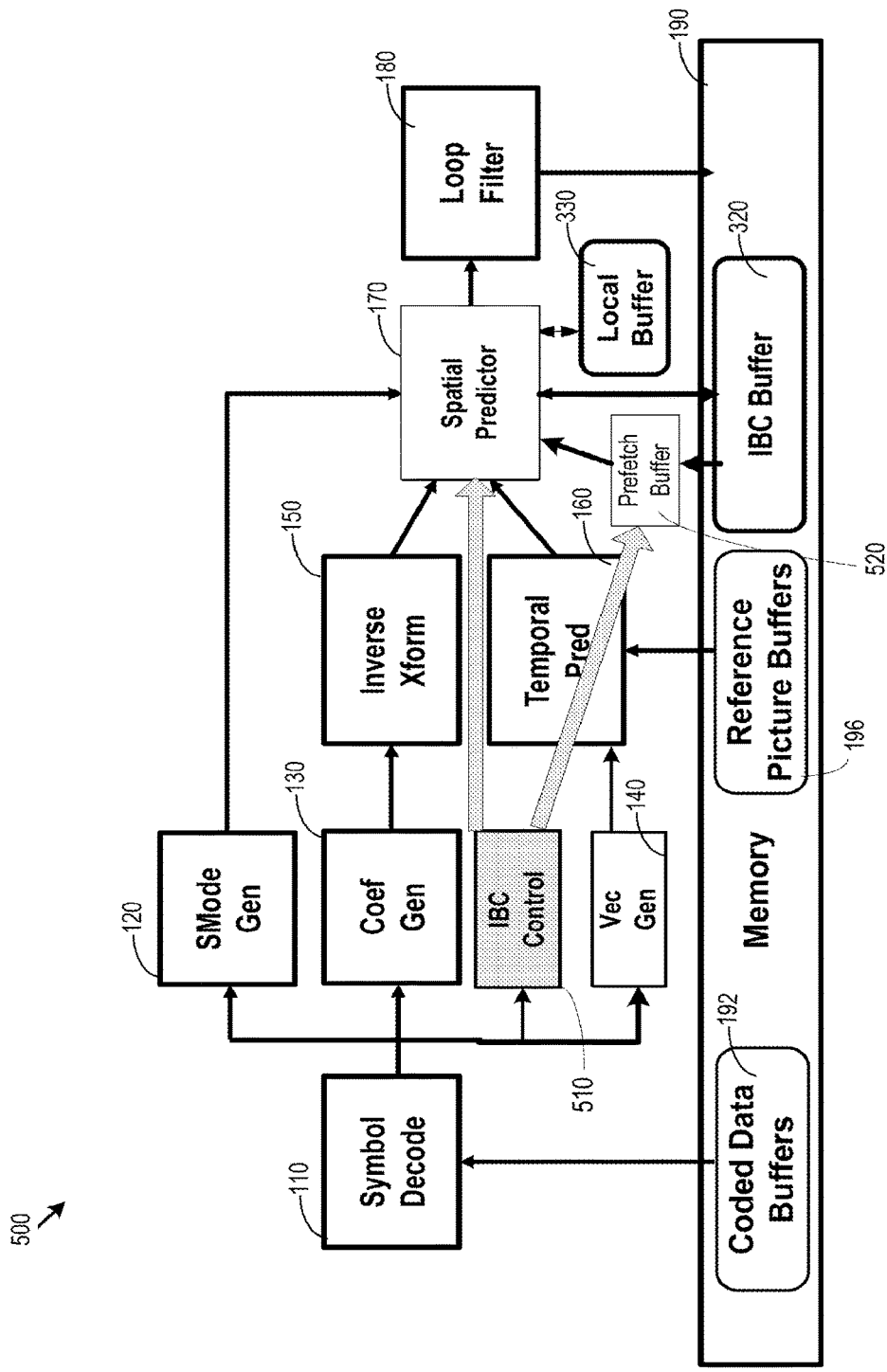
FIG. 5 illustrates an example video decoder.

FIG. 5 illustrates an example video decoder 500 that provides a technical solution involving a combination of the local buffer 330 combined with the temporal prediction unit 160, an intra block control unit 510, and a prefetch buffer 520 to manage the memory requests. This solution presents an implementation of the intra block copy with minimal incremental area addition to the existing video decoder chip/circuitry architecture, and no loss of pipeline performance.

The control unit 510 may include suitable circuitry and logic and/or code to perform the control and perform the intra block copy operations. The control unit 510 may identify the IBC operation to be performed based on the output of the symbol decoder 110. The symbol decoder 110 may decode the symbols of the input video content stream, which may contain a series of communication packets with encoded video data as payload. Alternatively, or in addition, the symbol decoder 110 may identify the intra block copy operation in response to symbols, such as instructions, or intra block copy information in the decoded video content. The symbols may be in the header or payload portion of the incoming video stream. The incoming video stream may include information indicating that the intra block copy is to be performed for one or more blocks. The information may further indicate the source blocks from which video data is to be copied. The information may further include identification of the destination blocks to which the data is to be copied. Alternatively, or in addition, if the data is to be copied from a sequence of blocks to another sequence, the information may indicate an identity of the starting blocks of each sequence and the number of blocks to be copied.

Thus, the control unit 510 may parse the intra block copy 'command' in the bit stream of the incoming video content. Upon identification of the intra block copy operations to be performed, the control unit 510 may identify source data which can be prefetched so as to hide latency. That is, the control unit 510, upon interpreting the decoded intra block copy related symbols, may operate ahead of pixel processing components of the video decoder 500. The control unit 510 may schedule fetches of the source data into the prefetch buffer 520, which is a buffer for prefetched data. Accordingly, when the current block 220 is being processed by the other components of the video decoder, the data would be readily available in the prefetch buffer 520, instead of the IBC buffer 320. Since the prefetch buffer 520 provides memory access at lower memory latency than the IBC buffer 320, the video decoder pipeline may operate faster to provide decoded video content output at the desired real-time frame rate for continuous playback. The data stored in the prefetch buffer 520 may be associated with the intra block copy operation to be performed, so that when a component of the decoder 100 performs or initiates performance of the intra block copy, the component may fetch the data from the prefetch buffer 520, instead of the IBC buffer 320.

The control unit 510 may control the prefetches so as to handle the possible distribution of the source decoded blocks 210 across the local buffer 330 and the IBC buffer 320. The control unit 510 may know the predetermined size of the local buffer 330. Further, the control unit 510 may know the present block being decoded, and thus which pixels will be in the local buffer 330 at the time the intra block copy is to be performed. Based on the predetermined size, and the current block being decoded, the control unit 510 may be able to calculate and thus predict, which pixels will be in the local buffer 330. The pixels that may not fit in the local buffer 330 may be stored in the IBC buffer 320 and may need a slower memory fetch request.

The control unit 510 may further compute details to fetch the content from the IBC buffer 320, such as an address of the source data, based on the intra block copy request and current block being decoded. The prefetch buffer may be sized to accommodate the largest possible block copy size, thereby guaranteeing that block copy fetches will hit valid data. Thus, the fixed local buffer 330 size may be large enough to guarantee memory fetches will hit valid data.

The control unit 510 may handle the example cases illustrated in FIG. 4 as described further. As in case 1, if the source data may be stored in the local buffer 330, no pipeline-stalling memory request, such as a DRAM request, may be performed. In cases 2 and/or 3, when the source data is partially or wholly in the off-chip storage 320, the control unit 510 may perform a memory request to prefetch the source data stored in the IBC buffer 320 into the local buffer 330. The control unit 510 may either perform the prefetch or schedule the prefetches so that the source data is copied into the local buffer 330 at a later time, but before the data is requested for the block copy by the spatial predictor 170 of the video decoder 500. Thus, the source data to be copied into the block 220 may be available in the local buffer 330 at the time block 220 is being decoded. Additionally, or alternatively, the source data will be available in the local buffer 330 at the time the intra block copy function associated with the block 220 is being performed by the video decoder, for example in the spatial predictor 170. Further, the control unit 510 may communicate to the spatial predictor 170, the availability of the source data in the local buffer 330. For example, the control unit 510 may set a value of a flag that is accessible by the spatial predictor 170 such that the flag indicates the availability of the source data in the local buffer 330. For example, the flag may be set to value 1 in case the source data is available in the local buffer and 0 otherwise. Alternatively, or in addition, the control unit 510 may pass a message to the spatial predictor 170 indicating such availability. Other techniques to communicate the availability may also be used. The spatial predictor 170, in response to the communication, may access the source data from the local buffer 330 or the IBC buffer 320. Alternatively, or in addition, in an example video decoder, the spatial predictor 170 may first attempt to fetch the source data from the local buffer 330. In case the source data is not available via the local buffer 330, the spatial predictor 170 may proceed to access the source data from the IBC buffer 320.

Figure 6:
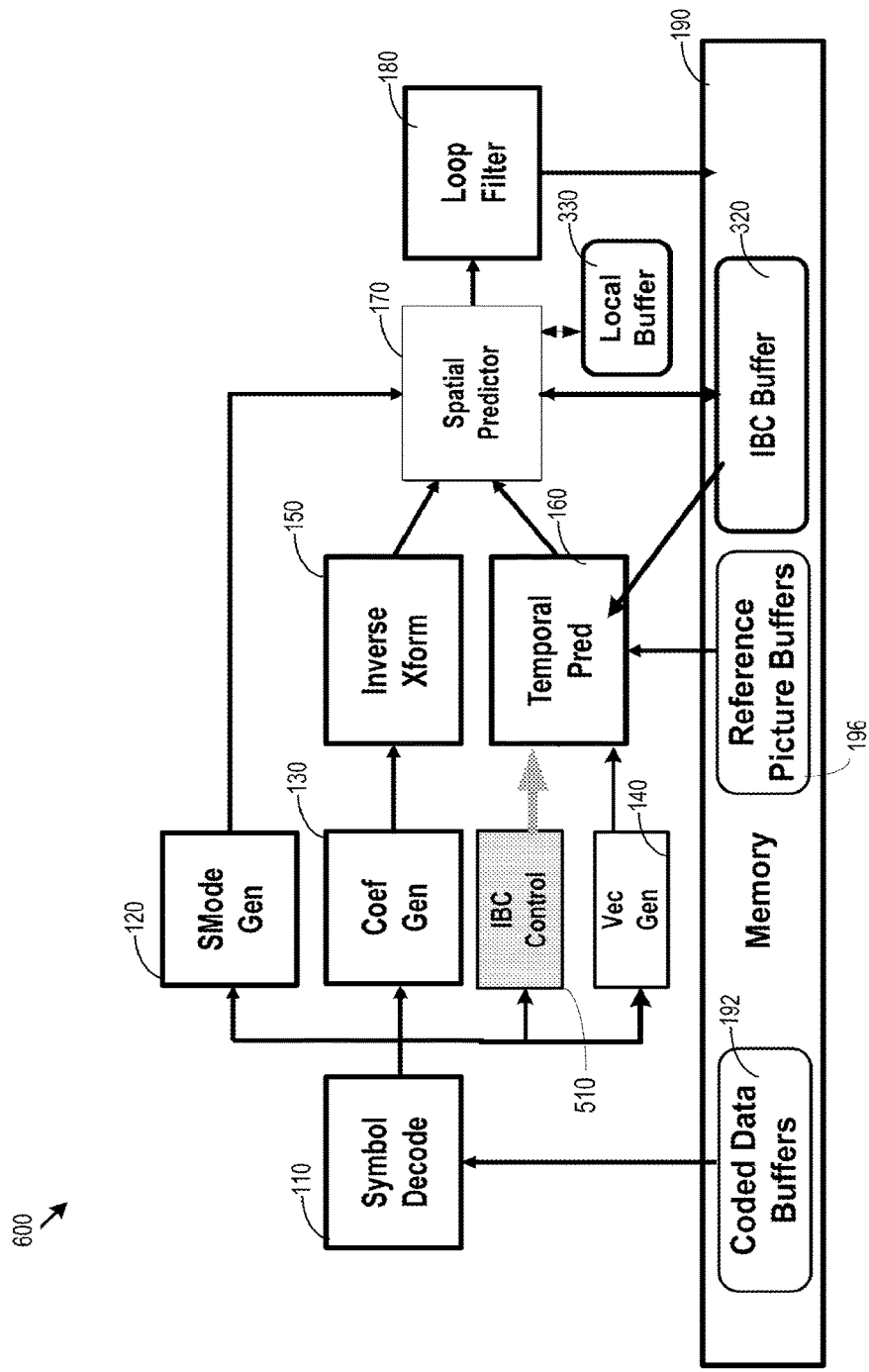
FIG. 6 illustrates an example video decoder.

The control unit 510 may use the memory access functionality of the temporal predictor 160 and spatial predictor 170 to perform or schedule the prefetches from the memory 190. For example, in the exemplary video decoder of FIG. 6, the temporal predictor 160 may be adapted to fetch data from the memory 190, as part of the temporal prediction operations that may involve older frames. The spatial predictor 170 may be adapted to fetch data from the memory 190 as part of the spatial prediction operations that may involve decoded blocks from the same frame, as described elsewhere in this document. Further yet, the control unit 510 may use the spatial predictor 170 to copy the data into the local buffer 330. The spatial decoder 170 may be adapted to store data in the local buffer 330 after completion of reconstruction operations. In one example video decoder, the local buffer 330 may be a part of the spatial predictor 170. Thus, the control unit 510 may send prefetch instructions to the temporal predictor 160 to prefetch the source data from decoded blocks 210 stored in the memory 190, and further send copy, or write instructions to the spatial predictor 170 to store the prefetched data in the local buffer 330. The prefetched data may be stored in the local buffer 330 at a location allocated to the current block 220.

The temporal predictor 160 may not otherwise be active during intra block copy operations and hence is available to perform the prefetches. Thus, video decoder 600 may hide the memory latency of the prefetches performed by the temporal predictor 160 in response to the intra block copy requests, and eliminate memory-latency performance bottleneck.

Figure 8:
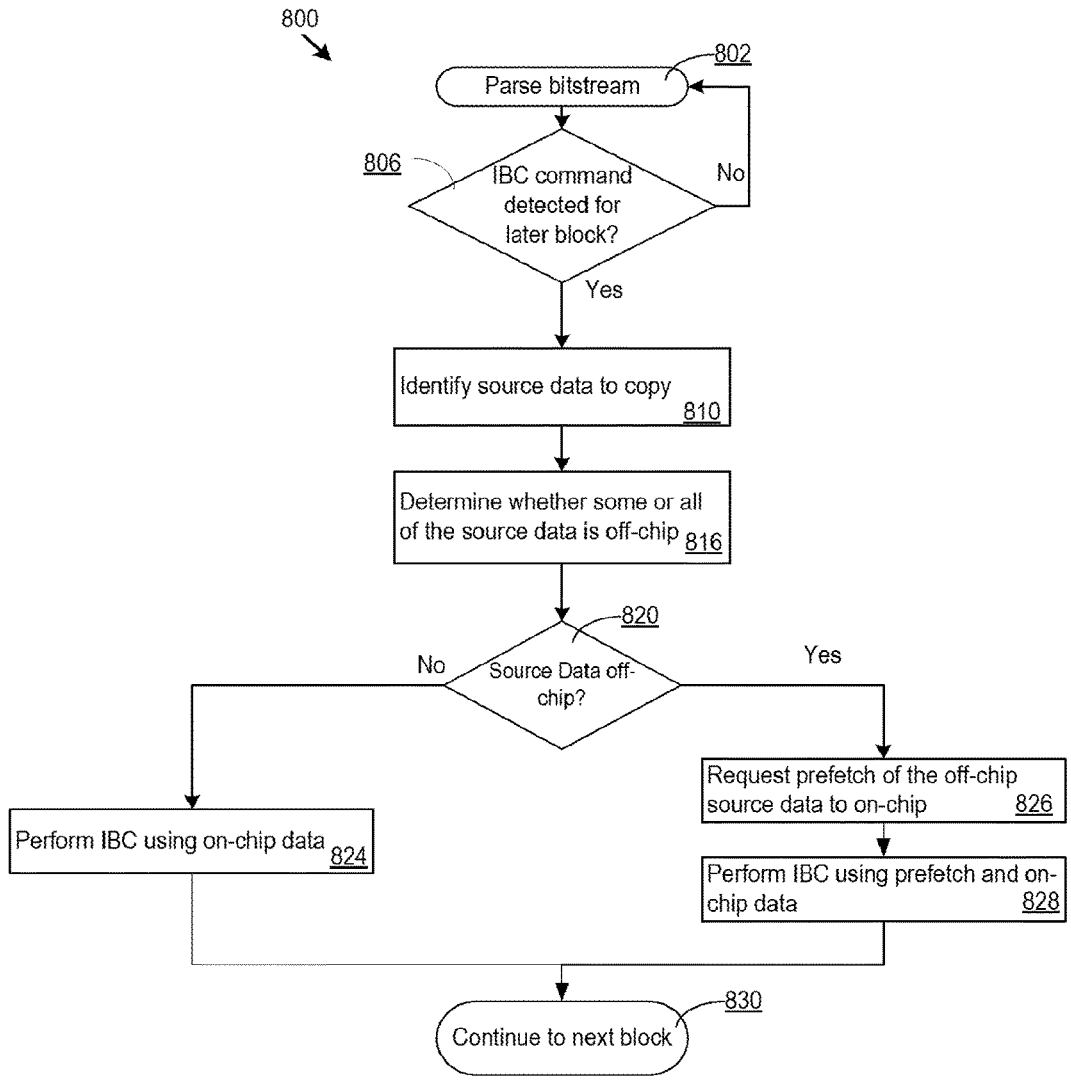
FIG. 8 illustrates a flowchart of example steps performed by an example video decoder.

At least some of the steps performed during a method to decode video content related bit stream with intra block copy operations are illustrated in the example flowchart of FIG. 8. The steps illustrated in FIG. 8 may hide memory latency performance bottlenecks by using prefetches of the source data to be used for the intra block copy operations, thus allowing a continuous real time video playback. The method may be performed by example video decoders such as those described throughout this disclosure.

The method may involve parsing an incoming bitstream (802). The bitstream may be an encoded bitstream containing video content. For example, the bitstream may be encoded using a HEVC standard, or any other video encoding standard. The incoming bitstream may be transmitted by another device and/or may be read from the memory storage unit 190. The control unit 510 may parse the bitstream to identify the intra block command in the bitstream (806). The parsing may be performed after the bitstream is decoded by the symbol decoder 110. The intra block copy command may involve a block that the decoder may handle at a later time, after completion of the current block that the video decoder is working on. The control unit 510 may identify the source data from the decoded blocks 210 that may be copied into the block that will be processed at a later time (810). The control unit 510 may identify the earlier decoded blocks 210 from which the source data may be copied. The control unit 510 may determine whether the source data is stored in the local buffer 330 or in memory 190 (816, 820). The control unit 510 may make this determination based on a predetermined size of the local buffer 330, the current block being processed by the decoder, and how many blocks in the video stream have been processed since the blocks containing the source data. In addition, or alternatively, a predetermined number of decoded blocks may be stored in the local buffer 330.

The local buffer 330 may store a predetermined number of previously decoded blocks. The spatial predictor 170 may overwrite the local buffer 330 with the most recently decoded blocks. For example, assume the predetermined number of blocks stored in the local buffer 330 is three. In this exemplary case, blocks k, k+1, and k+2 may be stored in the local buffer 330 after the blocks k, k+1, and k+2 are decoded, but prior to filtering of those blocks. However, a block k+3, after decoding would be stored in the local buffer 330 overwriting block k. It will be understood that the predetermined number of blocks may have a different value than 3, as used in this example.

Therefore, based on the predetermined number of blocks in the local buffer 330, the control unit 510 may determine whether the source data blocks 210 are stored in the local buffer 330 or the memory 190, or a combination of the two. In case the source data blocks are stored in the local buffer 330, the control unit 510 may not have to perform any further steps to fetch the data blocks, rather copy contents from location of the source data blocks on the local buffer 330 to the location allocated to the current block 220 in the local buffer 330 (824). In case the source data is partially or wholly stored in the memory 190, the control unit 510 may request prefetching the source data form the memory 190 and storing the prefetched data into prefetch buffer 520, if required, and use the on-chip prefetched data. (826, 828). The data stored in the memory 190 may be directly stored in the location allocated to the current block 220 in the prefetch buffer 520. The control unit 510 may request the temporal predictor 160 to perform the operations for prefetching the source data from the memory 190. The control unit 510 may request the spatial predictor 170 to perform the operations to store the prefetched source data into the local buffer 330. The control unit 510 may schedule the prefetch and copy operations so that the video decoder has the pixel data to be copied into the block associated with the intra block copy, when the block is processed by the video processor (830). Further, the control unit 510 may communicate to the decoder, for example to the spatial predictor 170, that the source data is available in the local buffer 330. In addition, the control unit 510 may prefetch the data from the IBC buffer 320, in the memory 190, to the location in the local buffer 330 allocated to the block for which the intra block copy is to be performed. Accessing the content from the local buffer 330 or the prefetch buffer may have negligible memory latency as compared to the IBC buffer 320 in the memory 190. In case, the content is not copied into the local buffer in this prefetch manner, a memory access will result at a later time, which may stall the decoder pipeline.

Figure 7:
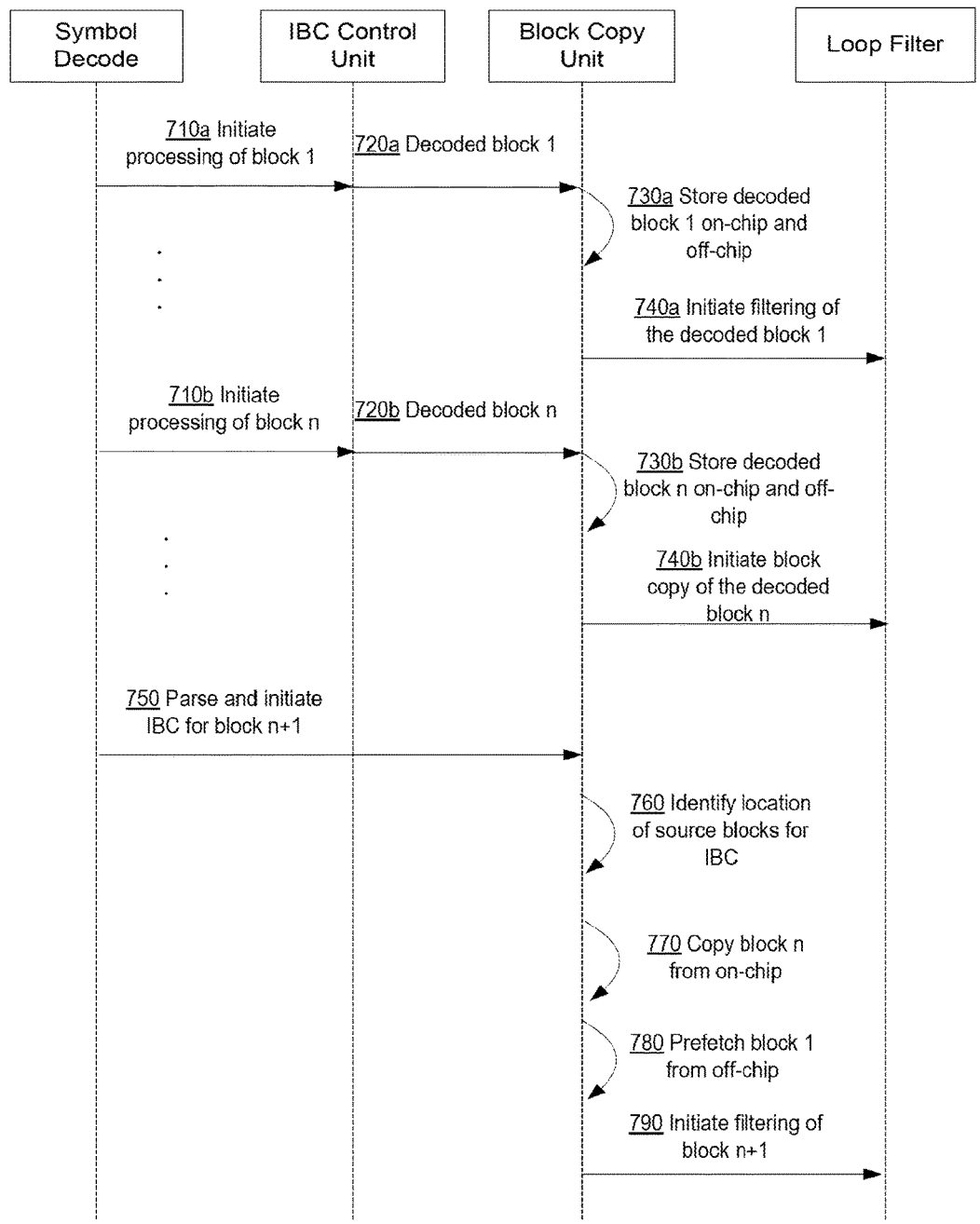
FIG. 7 illustrates exemplary steps performed when processing an example frame

FIG. 7 illustrates exemplary steps performed when processing an example frame. FIG. 7 represents the circuitry of example video decoder except the symbol decode 110, control unit 510, and loop filter 180 as one block titled pixel processing. Further, when processing blocks 1 through n of the frame, the processing is initiated at 710*ab*, decoded at 720*ab* by the pixel processing circuitry, and further stored in the local buffer 330 and memory 190 at 730*ab* before forwarding for the loop filter operation at 740*ab*. Block n+1 may involve an intra block copy instruction. Accordingly, at 750, the intra block copy instruction may be parsed and the control unit 510 notified of the instruction. The control unit 510 may identify the location of the source blocks. In case the source block involves a recently decoded block that may be stored in the local buffer 330, such as n−1, the contents of such a recent source block may be copied from the local buffer 330 itself at 770. In case, the source block involves a decoded block such that it is no longer in the local buffer 330, for example block 1, a prefetch operation may be initiated to copy the contents of that block from the memory 190 at 780. Once all contents of the block n+1 have been copied, from decoded source blocks, the block n+1 may be forwarded for the loop filtering, as indicated by 790. While FIG. 7 illustrates an exemplary sequence, it should be noted that the order of the events may be modified according to the decoder pipeline timing requirements. For example, the IBC control unit 510 may identify an intra block copy in block n substantially simultaneously while a prefetch operation is in progress for block n−1. Further, a block copy operation may be in progress for block n−2 at substantially the same time.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A device comprising:
at least one circuit configured to:
decode a current block within a frame of video data, the frame comprised of a plurality of blocks;
identify an intra-block copy request (IBC request) for the current block, wherein the IBC request comprises copying content from a source block to the current block of the frame, wherein the source block is within the frame and has been decoded; and
copy the content of the source block to the current block.

2. The device of claim 1, wherein the at least one circuit is further configured to:
pre-fetch the content of the source block prior to completion of decoding of the current block.

3. The device of claim 1, wherein the at least one circuit is further configured to filter decoded blocks of the video data.

4. The device of claim 3, wherein, an internal memory is configured to store a predetermined number of decoded blocks within the frame of the video data, the frame being currently decoded by the device.

5. The device of claim 4, wherein the predetermined number of decoded blocks stored within the internal memory are stored prior to a block copy operation of the device.

6. The device of claim 5, wherein the decoded blocks, prior to the block copy operation, are further stored in an external memory.

7. The device of claim 6, wherein memory latency of the internal memory is lower than memory latency of the external memory.

8. A method comprising:
receiving, using at least one circuit, a frame, the frame divided into a plurality of blocks;
decoding, using the at least one circuit, a block from among the blocks of the frame; and
decoding, using the at least one circuit, another block from among the blocks of the frame, the decoding the another block comprising copying contents of the decoded block of the frame as decoded contents of the another block, wherein the block is different than the another block.

9. The method of claim 8, further comprising:
filtering, using circuitry, the decoded block of the frame; and
storing, using circuitry, the filtered block of the frame in a memory storage device, for display.

10. The method of claim 9, further comprising:
storing, using the at least one circuit, at least a part of the decoded block of the frame, prior to filtering, in a local buffer.

11. The method of claim 10, wherein, copying the contents of the decoded block comprises copying at least part of the contents of the decoded block from a memory storage device.

12. The method of claim 11, wherein, copying the contents of the decoded block further comprises copying at least part of the contents of the decoded block from the local buffer.

13. The method of claim 8, wherein the received frame is received from a source device for screen casting.

14. A computer program product comprising code stored in a non-transitory computer-readable medium, the code comprising:
code to receive video data, the video data comprising a plurality of video frames, each video frame of the video frames further comprising blocks of pixels;
code to decode a first block of pixels;
code to identify an intra block copy instruction associated with decoding a second block of pixels; and
code to, in response to the intra block copy instruction, copy part of the decoded first block of pixels to the second block of pixels.

15. The computer program product of claim 14, wherein the intra block copy instruction identifies the first block of pixels as a source of contents for the second block of pixels.

16. The computer program product of claim 15, wherein the code further comprises:
code to filter the decoded first block of pixels; and
code to store the filtered first block of pixels for display.

17. The computer program product of claim 15, wherein the code further comprises:
code to, in response to the intra block copy instruction, copy part of a decoded third block of pixels to the second block of pixels, wherein the intra block copy instruction further identifies the third block of pixels as another source of contents for the second block of pixels.

18. The computer program product of claim 14, wherein the code further comprises:
code to parse the intra block copy instruction to determine one or more source blocks for the intra block copy instruction for the second block of pixels, wherein contents of the one or more source blocks are copied into the second block of pixels;
code to identify one or more locations of the one or more source blocks for the intra block copy instruction; and
code to copy contents from the one or more source blocks from the identified one or more locations into the second block of pixels.

19. The computer program product of claim 18, wherein:
the first block of pixels is identified as a source block for the intra block copy instruction and a location of the first block of pixels is identified as a first memory device; and
a third block of pixels is identified as another source block for the intra block copy instruction and a location of the third block of pixels is identified as a second memory device that has a higher latency than the first memory device.

20. The computer program product of claim 19, wherein the code further comprises:
code to identify the one or more locations of the one or more source blocks for the intra block copy instruction based on a predetermined number of blocks of pixel stored in the first memory device.

* * * * *